United States Patent
Bagheri et al.

(10) Patent No.: US 11,824,813 B2
(45) Date of Patent: *Nov. 21, 2023

(54) METHOD AND APPARATUS FOR GENERATING A CSI REPORT

(71) Applicant: Lenovo (Singapore) Pte. Ltd., New Tech Park (SG)

(72) Inventors: Hossein Bagheri, Urbana, IL (US); Hyejung Jung, Northbrook, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 163 days.

This patent is subject to a terminal disclaimer.

(21) Appl. No.: 17/462,015

(22) Filed: Aug. 31, 2021

(65) Prior Publication Data

US 2021/0399862 A1    Dec. 23, 2021

Related U.S. Application Data

(63) Continuation of application No. 16/593,893, filed on Oct. 4, 2019, now Pat. No. 11,128,429.

(Continued)

(51) Int. Cl.
  *H04L 5/00*       (2006.01)
  *H04W 72/1273*    (2023.01)
  *H04W 72/23*      (2023.01)

(52) U.S. Cl.
  CPC .......... *H04L 5/0057* (2013.01); *H04L 5/0041* (2013.01); *H04L 5/0048* (2013.01); *H04W 72/1273* (2013.01); *H04W 72/23* (2023.01)

(58) Field of Classification Search
  CPC .............. H04W 72/1273; H04W 72/23; H04L 5/0048; H04L 5/0041; H04L 5/0057

(Continued)

(56) References Cited

U.S. PATENT DOCUMENTS 11,128,429 B2 *   9/2021   Bagheri ................ H04L 5/0057
2018/0145809 A1   5/2018   Kwak et al.
(Continued)

FOREIGN PATENT DOCUMENTS

WO       20180204774 A1    11/2018

OTHER PUBLICATIONS

Gimmler-Dumont, Communication pursuant to Article 94(3) EPC, Application No. 19 787 462.1, European Patent Office, Rijswijk, NL, Feb. 14, 2023.

(Continued)

*Primary Examiner* — Peter G Solinsky
(74) *Attorney, Agent, or Firm* — Loppnow & Chapa; Matthew C. Loppnow (57) ABSTRACT

A control channel can schedule a DL data transmission for a BWP, allocate a set of RBs corresponding to the scheduled DL data, and indicate a first PRB bundling size for the scheduled DL data transmission. A transmitted DL data transmission can be based on each RB of a first PRG having a same precoding applied as other RB of the PRG. The first PRG can partition the BWP with the first PRB bundling size. The second PRG can partition the BWP with a determined second PRB bundling size. A CSI report including the calculated CSI can be received on an UL channel. CSI can be calculated based on at least one DMRS associated with the DL data transmission and based on each RB of a second PRG having a same precoding applied as other RBs of the second PRG.

15 Claims, 6 Drawing Sheets

Related U.S. Application Data (60) Provisional application No. 62/742,243, filed on Oct. 5, 2018.

(58) Field of Classification Search
USPC .......................................................... 370/330
See application file for complete search history.

(56) References Cited

U.S. PATENT DOCUMENTS

| | | | |
|---|---|---|---|
| 2020/0112419 A1* | 4/2020 | Bagheri | ................ H04L 1/0026 |
| 2020/0359228 A1* | 11/2020 | Sirotkin | ................ H04L 5/0094 |

OTHER PUBLICATIONS

Huawei et al: "Remaining issues for CSI reporting", 3GPP Draft; R1-1719425, 3rd Generation Partnership Project (3GPP), Mobile Competence Centre ; 650, Route Des Lucioles; F-06921 Sophia-Antipolis Cedex; France, vol. RAN WG1, No. Reno, USA; Nov. 17, 2017.

* cited by examiner

METHOD AND APPARATUS FOR GENERATING A CSI REPORT

BACKGROUND

1. Field

The present disclosure is directed to a method and apparatus for generating a Channel State Information (CSI) report.

2. Introduction

Presently, wireless communication devices, such as User Equipment (UE), communicate with other communication devices using wireless signals over a network. CSI is used by the network to adjust Downlink (DL) transmission parameters to the UEs. Existing Third Generation Partnership Project (3GPP) New Radio (NR) specifications, such as NR release 15, support CSI estimation using CSI-Reference Signals (CSI-RS) and the report is transmitted in dedicated Physical Uplink Control Channel (PUCCH)/Physical Uplink Shared Channel (PUSCH) resources.

According to 3GPP Technical Specification (TS) 38.214, the time and frequency resources that can be used by the UE to report CSI are controlled by the base station (gNB). CSI may include a Channel Quality Indicator (CQI), Precoding Matrix Indicator (PMI), CSI-RS resource indicator (CRI), Synchronization Signal (SS)/Physical Broadcast Channel (PBCH) Block Resource Indicator (SSBRI), Layer Indicator (LI), Rank Indicator (RI) and/or Layer 1-Reference Signal Received Power (L1-RSRP).

Also, according to 3GPP TS 38.214, for CQI, PMI, CRI, SSBRI, LI, RI, and L1-RSRP, a UE is configured by higher layers with N≥1 CSI-ReportConfig reporting settings, M≥1 CSI-ResourceConfig resource settings, and one or two list(s) of trigger states given by the higher layer parameters CSI-AperiodicTriggerStateList and CSI-SemiPersistentOnPUSCH-TriggerStateList. Each trigger state in CSI-AperiodicTriggerStateList contains a list of associated CSI-ReportConfigs indicating the resource set Identifiers (IDs) for channel and optionally for interference. Each trigger state in CSI-SemiPersistentOnPUSCH-TriggerStateList contains one associated CSI-ReportConfig.

CSI is reported by the UEs to the network, and the reporting can be in a periodic, semipersistent, or a-periodic manner. In periodic reporting, a UE reports CSI to the network periodically with a configured periodicity. Semi-persistent CSI reporting is similar to the periodic reporting with a difference that CSI reporting can be activated/deactivated by Downlink Control Information (DCI). A-periodic CSI (A-CSI) reporting is triggered by DCI. In existing NR specifications, a-periodic reporting is triggered by an Uplink (UL) DCI, such as a DCI format including UL grant information, and the CSI report is transmitted on a dedicated UL data channel, such as PUSCH. CSI-RS can be transmitted periodically/a-periodically, such as from a set of configured CSI-RS resources.

NR Release 15 supports two target Block Error Rate (BLER) thresholds, 10^-1 and 10^-5, for CQI reporting. The second threshold improves reliability for Ultra-Reliable Low Latency Communication (URLLC) operation.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

At least some embodiments provide a method and apparatus for generating a CSI report. At least some embodiments can also provide CSI trigger, measurement, and reporting for URLLC using downlink channels.

According to a possible embodiment, a control channel can be received. The control channel can schedule a DL data transmission for a Bandwidth Part (BWP). The control channel can allocate a set of Resource Blocks (RBs) corresponding to the scheduled DL data. The control channel can indicate a first Physical Resource Block (PRB) bundling size for the scheduled DL data transmission. The first PRB bundling size can be a first number of contiguous RBs. The DL data transmission can be received. The DL data transmission can be based on each RB of a first Precoding Resource Group (PRG) having a same precoding applied as other RB of the PRG. The first PRG can partition the BWP with the first PRB bundling size. A second PRB bundling size can be determined. The second PRB bundling size can be a second number of contiguous RBs. The second PRB bundling size may not be larger than the first PRB bundling size. CSI can be calculated in response to a CSI report trigger. The CSI can be calculated based on at least one Demodulation Reference Signal (DMRS) associated with the DL data transmission. The CSI can be calculated based on each RB of a second PRG having a same precoding applied as other RBs of the second PRG. The second PRG can partition the BWP with the second PRB bundling size. A CSI report including the calculated CSI can be generated. The CSI report can be transmitted on an UL channel.

According to another possible embodiment, a plurality of CSI report configurations can be received. At least one of the plurality of CSI report configurations can include a DMRS based CSI measurement. A Physical Downlink Control Channel (PDCCH) containing a DCI format that schedules a Physical Downlink Shared Channel (PDSCH) can be received. The DCI format can include an indication of triggering a CSI report and the triggered CSI report can correspond to a CSI report configuration selected from the plurality of CSI report configurations. At least one CSI resource for channel measurement associated with the triggered CSI report can be determined according to the corresponding CSI report configuration. Each of the at least one CSI resource for the channel measurement can be a DMRS of the PDSCH, a plurality of CSI reference signals, or a plurality of synchronization signal/physical broadcast channel blocks. CSI can be computed based on the at least one CSI resource for the channel measurement. A CSI report can be generated based on the computed CSI. A PUCCH resource can be determined based on the CSI report configuration. The CSI report can be transmitted on the PUCCH resource.

Figure 1:
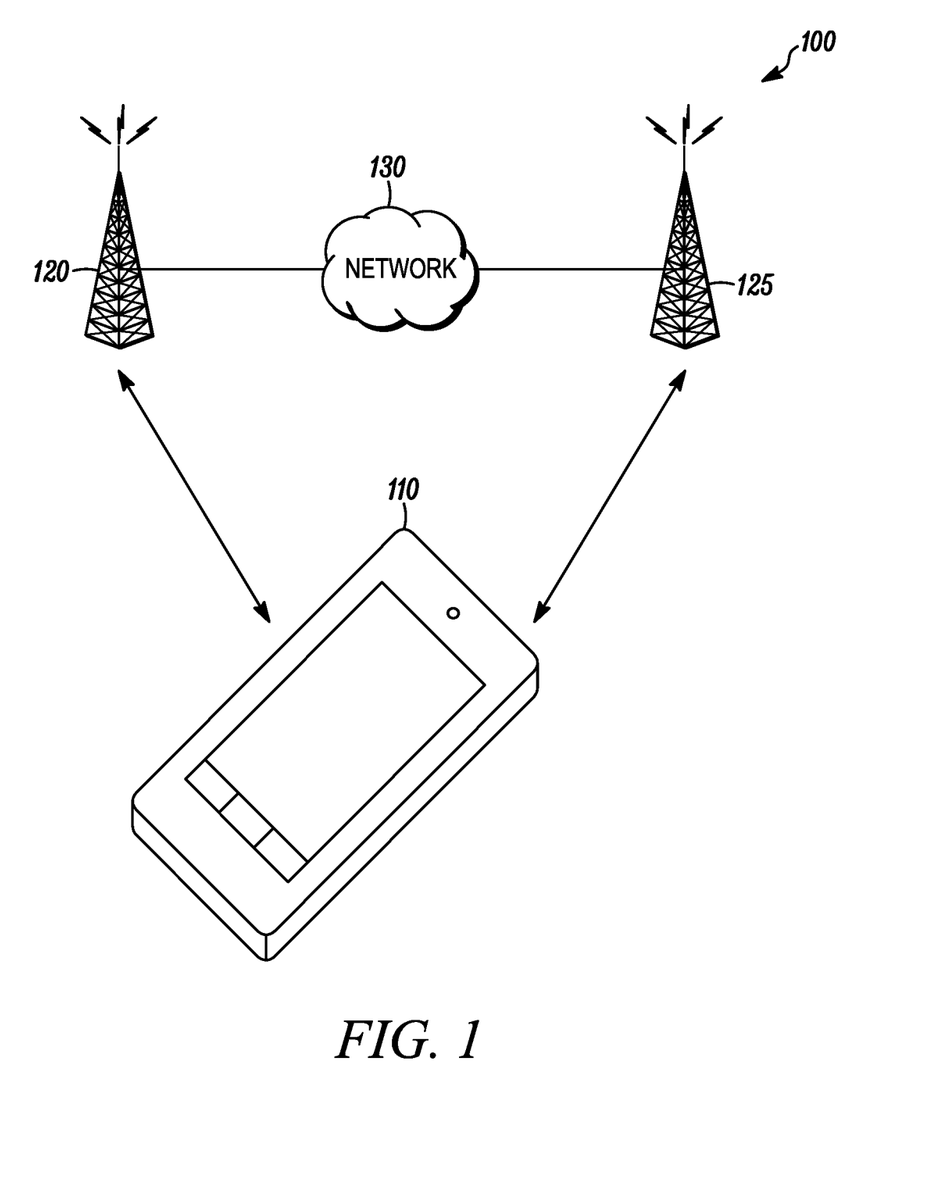
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3GPP-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

A-CSI triggering can be provided via DL assignment. For example, A-CSI triggering via DL assignment can save control resources in DL heavy traffic scenario and/or can enable fast CSI reporting for PDSCH retransmissions. The triggered A-CSI can be transmitted on PUCCH and/or PUSCH.

DMRS-based CSI estimation can also be provided. To reduce the processing at the UE, the CSI reporting delay, such as compared to the periodic report, PUCCH resources, and CSI-RS transmissions, such as when aperiodic/periodic CSI resources can be less frequent in time to achieve the same CSI accuracy satisfying the CSI reliability target, DMRS associated with PDSCH/PDCCH or PDSCH, such as PDSCH channel bit Log-Likelihood Ratios (LLRs)/input Signal-to-Noise Ratio (SNR) to decoder, can be used along with CSI-RS to perform CSI estimation. For example, input SNR to the PDSCH decoder, or other things like DMRS associated with PDCCH/PDSCH, channel bit LLRs, etc., can be used in addition to the CSI-RS, such as a reference signal.

Assuming rank, precoding, and/or beam information changing slowly compared to CQI/LI, a UE can estimate the Signal-to-Interference-plus-Noise ratio (SINR) of PDSCH and associated DMRS with the scheduled rank and scheduled precoding matrix via precoded DMRS. Accordingly PDSCH, or DMRS associated with PDSCH/PDCCH, can be used to estimate CSI, such as CQI/LI. CSI-RS may still be necessary for CSI computation, such as for a gNB to quickly know of CSI of TRP/rank/beam combinations other than one used for the current PDSCH, and thus, aperiodic CSI-RS resources can also be configured.

At least some embodiments, unless otherwise specified, can refer to such schemes as PDSCH DMRS-based or PDSCH-based CSI estimation, although, instead of/in addition to DMRS, DL data LLRs, SNR information, etc. can be used in CSI estimation/measurement. With DMRS-based CSI estimation, the UE can estimate CQI and LI.

At least some embodiments can provide design details for aperiodic CSI triggering via DL assignment using DMRS-based CSI estimation. For example, at least some embodiments can provide CQI index derivation from PDSCH. TS 38.214 provides rules/assumptions for CQI index derivation which are described later in this disclosure. These assumptions have been mainly developed based on CSI-RS based CSI estimation.

At least some embodiments can address PDSCH PRB bundling impact. In exiting NR specifications, PDSCH PRB bundling size can be indicated dynamically in DCI. According to TS 38.212, DCI format 1-1 has a DCI field for PRB bundling size indication. For example, TS 38.212 indicates PRB bundling size indicator is 0 bit if the higher layer parameter prb-BundlingType is not configured or is set to 'static', or is 1 bit if the higher layer parameter prb-BundlingType is set to 'dynamic' according to Subclause 5.1.2.3 of TS 38.214. According to 38.214, as also described later in this disclosure, in the CSI reference resource, the UE shall assume the following for the purpose of deriving the CQI index, and if also configured, for deriving PMI and RI: Assume PRB bundling size of 2 PRBs. Other assumptions are described later in this disclosure.

According to a possible embodiment, the UE can assume the PRB bundling size for the purpose of deriving the CQI index is equal to the PRB bundling size of the PDSCH used for/associated with CSI calculation or PDSCH corresponding to the CSI reference resource. As the PDSCH and corresponding DMRS have already been precoded with a certain precoder per a set of contiguous PRBs with precoding granularity of the PRB bundling size of PDSCH/DMRS, it can be difficult to derive PMI and CQI assuming a PRB bundling size different than the PRB bundling size used for PDSCH/DMRS. For example, it can be difficult due to non-linear impact of PRB-bundling size in channel estimation. For example, a gNB may decide to use a second PRB bundling size for a future PDSCH, which would be scheduled based on the generated CSI report, such as CQI index derived assuming a first PRB bundling size that is different than the second PRB bundling size, from the current PDSCH. For a UE receiving PDSCH, the UE can assume that the precoding granularity is the PRB bundling size, which can be based on the PRB bundling size indicator in the DCI, and can assume the same precoding is applied for any contiguous allocation of PRBs in a Precoding Resource Block Group (PRG) having a size the same as the PRB bundling size. Consecutive PRBs can be defined for the BWP on which PDSCH is received.

In another embodiment, if CSI estimation is based on DMRS of PDSCH, it can be assumed that the PRB bundling is the size same as the PRB bundling size of the corresponding PDSCH. Alternatively, the UE can assume the PRB bundling size is equal to a configured PRB bundling size for the purpose of deriving the CQI index. Alternatively, a field in the DCI can indicate the bundling size the UE shall assume for the purpose of deriving the CQI index. Alternatively, the UE may not be expected to be requested a CSI report if the PRB bundling size of the PDSCH associated with the CSI calculation is different than a PRB bundling size assumed for the purpose of driving the CQI index. For example, UE may not report CSI if the PRB bundling size of the PDSCH associated with the CSI calculation is different than '2'.

In another embodiment if a CSI report is implicitly triggered, such as in a case of Negative Acknowledgement (NACK) for the scheduled PDSCH, the UE may only be expected to generate the CSI report if the bundling size of the corresponding PDSCH is the same as the bundling size assumed for the purpose of driving the CQI index, such as a bundling size of '2' for deriving the CQI index. In one example, the PRB bundling size assumed for the purpose of CSI estimation can be equal to or smaller than the PRB bundling size, such as 2 RB, of the corresponding PDSCH.

Embodiments can address PDSCH with repetition impact. For higher PDSCH reliability, PDSCH can be repeated. For example, in existing NR specifications, PDSCH can be repeated by a configured number of repetitions and a single PDCCH can schedule the PDSCH.

In LTE-Higher-Reliability and Low-Latency Communication (HRLLC), PDCCH can indicate a number of PDSCH transmissions associated with the PDCCH. The PDCCH may or may not be transmitted with a PDSCH repetition. PDSCH transmissions can be soft combined after a PDCCH is successfully received. The number of transmissions, the number of PDSCH transmissions associated with the PDCCH starting with the current TTI, can be indicated in a DCI field.

In an embodiment, the UE can assume the number of PDSCH repetitions within a certain time container, such as a TTI, slot, mini-slot, and/or aggregate slots, for the purpose of deriving the CQI index when the PDSCH is used for/associated with CSI calculation. In another embodiment, the UE can derive the CQI index corresponding to single PDSCH transmission or a defined/configured/dynamically indicated number of repetitions, such as via scaling LLRs. For example, when PDSCH repetitions are soft combined, LLRs can be boosted, such as for example, by ~3 dB in a case of two repetitions. Accordingly, the UE can normalize the soft combined LLRs of the PDSCH repetitions to the number of repetitions or according to other similar approaches, such as by employing a function to generate a CQI index from a number, N, of LLRs vectors corresponding to the number, N, of PDSCH repetition instances. This can be employed in cases where the gNB does not know how many repetitions UE has soft combined. In one example, the UE can derive the CSI corresponding to the number of PDSCH repetitions detected or indicated in the DCI, and can indicates the number of PDSCH repetitions used for CSI computation in the CSI report.

According to a possible embodiment, if the PDCCH is repeated multiple times, such as in different symbols/mini-slots/slots/TTIs, and assuming a similar approach as LTE-HRLLC for PDCCH repetition scheduling the same TB, such as when the gNB has no knowledge of which PDCCH of the repeated PDCCH the UE will receive, the UE, such as a UE supporting PDCCH/PDSCH repetition reception capability, can derive the CQI index assuming the indicated number of PDSCH repetitions in the DCI it received. The UE can indicate in the CSI report the number of PDSCH repetitions used to derive the CQI index. In another embodiment, the UE can derive the CQI index assuming no PDSCH repetitions. In another embodiment, the UE can derive the CQI index, assuming a fixed/configured/dynamically indicated number PDSCH repetitions.

At least some embodiments can take into account the impact of higher order modulation, such as 256 Quadrature Amplitude Modulation. For example, according to TS 38.214, the UE shall derive for each CQI value reported in uplink slot n the highest CQI index which satisfies the following condition: A single PDSCH Transport Block (TB) with a combination of modulation scheme, target code rate and TB size corresponding to the CQI index, and occupying a group of downlink physical resource blocks termed the CSI reference resource, could be received with a TB error probability not exceeding: 0.1, if the higher layer parameter cqi-Table in CSI-ReportConfig configures 'table 1' (corresponding to Table 5.2.2.1-2), or 'table2' (corresponding to Table 5.2.2.1-3), or 0.00001, if the higher layer parameter cqi-Table in CSI-ReportConfig configures 'table3' (corresponding to Table 5.2.2.1-4).

For URLLC, higher order modulations, such as 256 Quadrature Amplitude Modulation (QAM), may not be needed. For instance, in existing NR specifications, 'table3', corresponding to Table 5.2.2.1-4, of TS 38.214, only supports up to 64 QAM, whereas 'table2', corresponding to Table 5.2.2.1-3, of TS38.214 supports up to 256 QAM.

According to a possible embodiment, if the PDSCH from which the CQI index is derived has a higher modulation order, such as 256 QAM modulation, than the maximum modulation order supported for data scheduling of URLLC, such as 64 QAM, the UE can derive the CQI index using only a number, x, of most significant bits of the higher order modulation. For example, only 6 out of 8 bits of 256 QAM corresponding to the highest reliability bit indexes/positions can be used to derive the CQI index. As a further example, only LLRs of a number, x, of the Most Significant Bits (MSB) bits can used.

In another embodiment, the UE can derive the CQI index only if the PDSCH modulation order is not greater than the maximum supported modulation order of the URLLC DL data. In another embodiment, the number, x, can be configured/dynamically indicated or determined based on a UE capability. LLR can be mapped to Mean Mutual Information per Bit (MMIB)/Effective SNR Mapping (EESM) effective SNR metric for CQI determination.

In another embodiment, the UE may not be expected to provide a CSI report associated with a certain reliability target, such as for PDSCH, when the report is triggered/derived via PDSCH associated with a different reliability target. For example, the URLLC CSI may not be derived from eMBB PDSCH or can be derived from Enhanced Mobile Broadband (eMBB) PDSCH based on UE capability.

At least some embodiments can provide PDSCH rate-matched around a CORESET impact. According to a possible embodiment, the UE can assume the same number of front-loaded DMRS symbols and same number of any additional DMRS symbols as that in the scheduled PDSCH for computing/deriving the CSI including CQI index. The UE assumption on the PDSCH rate-matching around on a Control Resource Set (CORESET) and PDSCH subcarrier spacing can be same as that for the scheduled PDSCH for CSI computation.

At least some embodiments can provide CSI report association. CQI index can be derived based on assumptions on a RI and a PMI. For RI/PMI derived from CSI-RS, such as using an existing CSI reporting procedure, the CSI resource configuration, such as CSI-ResourceConfig parameter in TS 38.331, can provide the DL BWP that the CSI-RS associated with this CSI-ResourceConfig are located in.

According to TS 38.214, Each Reporting Setting CSI-ReportConfig is associated with a single downlink BWP indicated by higher layer parameter bwp-Id given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer LI, L1-RSRP, CRI, and SSBRI.

In general, if the UE is configured with multiple CSI reports, if the UE generates a CSI report, such as a CQI index, from PDSCH or DMRS associated with the PDSCH/PDCCH, the gNB can be able to understand which or which set of configured CSI report(s) the generated report belongs to. According to a possible embodiment, the UE can indicate a CSI report configuration index corresponding to one or more of the configured CSI report(s), where the indication can inform gNB which of the configured CSI reports the generated CSI report, such as CQI index, from PDSCH or DMRS associated with the PDSCH/PDCCH is associated/applicable.

According to a possible embodiment, a gNB can configure PUCCH resources for DMRS-based CSI, and the UE can indicate the CSI-configuration subset from the set of configured CSI reporting configurations index in the PUCCH. As the DMRS-based CQI can be a differential CQI, the derived DMRS-based CQI index can be applicable to/associated with a subset of CSI configurations, such as the ones that share the same codebook subset restriction or BWP-ID as the PDSCH. According to a possible embodiment, the UE can derive the indices of the subset of CSI configurations based on a parameter of the PDSCH scheduling, such as based on a BWP-ID/codebook subset restriction.

According to another possible embodiment, the UE may not be expected to generate a CSI report or derive the CQI index from PDSCH or DMRS associated with the PDSCH/PDCCH in one or more of the following scenarios. The UE may not be expected to generate a CSI report or derive the CQI index from PDSCH or DMRS associated with the PDSCH/PDCCH if the CQI index derived from PDSCH or DMRS associated with the PDCCH based on RI and/or PMI assumptions derived from CSI-RS corresponding to a first DL BWP and the first DL BWP is different than the PDSCH BWP. The UE also may not be expected to generate a CSI report or derive the CQI index from PDSCH or DMRS associated with the PDSCH/PDCCH if the CQI index derived from PDSCH or DMRS associated with the PDCCH based on RI and/or PMI assumptions derived from CSI-RS corresponding to a first DL BWP and the first DL BWP is smaller than the PDSCH BWP. The UE also may not be expected to generate a CSI report or derive the CQI index from PDSCH or DMRS associated with the PDSCH/PDCCH if the CQI index derived from PDSCH or DMRS associated with the PDCCH based on RI and/or PMI assumptions derived from CSI-RS corresponding to a first DL BWP and the first DL BWP is larger than the PDSCH BWP. These embodiments can be useful, for example, in scenarios that the CSI report is implicitly triggered, such as via PDSCH NACK or decoding failure.

At least some embodiments can provide for PUCCH resource determination for PDSCH/DMRS based CSI report. According to a possible embodiment, a UE can receive an indication to trigger a PDSCH/DMRS based CSI report, such as via DL DCI, where the indication can implicitly or explicitly indicate a CSI report configuration identity. The UE can determine a PUCCH resource, including an UL BWP identity and a PUCCH resource identity, for the PDSCH/DMRS-based CSI report from configured PUCCH resources based on the indicated CSI report configuration identity. This PUCCH resource determination method can also be applicable to CSI-RS based CSI reporting triggered by DL DCI. In one example, the configured PUCCH resources can be PUCCH resources configured for PDSCH/DMRS based CSI reports. In another example, the configured PUCCH resources can be PUCCH resources configured for CSI report triggered by DL DCI.

In another embodiment, a UE can determine a PUCCH resource for a PDSCH/DMRS-based CSI report from configured PUCCH resources, based on an indicated Transmission Configuration Indication (TCI) state in DL DCI scheduling the PDSCH. The TCI state for PDSCH indicated in DL DCI can implicitly indicate to the UE the CSI-RS Resource Index (CRI) or SS/PBCH Resource Indicator (SSBRI) that should be assumed to calculate other CSI information, such as CQI, from the received PDSCH/DMRS. In one example, each activated TCI state can be associated one PUCCH resource or a set of PUCCH resources for transmission of the PDSCH/DMRS-based CSI report. In another example, the UE can identify a corresponding CSI report configuration based on the indicated TCI state and can determine a PUCCH resource based on the identified CSI report configuration.

In one example, the CSI report can include an indication of a requested number of PDSCH repetitions. In one example, the requested number of PDSCH repetitions can be the minimum PDSCH repetitions with which the UE expects the PDSCH or a TB of a PDSCH to be successfully received. The requested number of PDSCH repetitions can correspond to a previously received PDSCH that the UE did not receive successfully and the requested number of PDSCH repetitions can be based on all the previous received PDSCH for the same TB, such as based on an LLR soft buffer with LLR combining for the same bit. In another example, the requested number of PDSCH repetitions can correspond to a new or initial transmission TB of PDSCH.

In one example, if the PDSCH includes multiple TBs, the CSI feedback based on DMRS/PDSCH can include CSI feedback for the multiple TBs or one of the TBs, such as a first TB of the multiple TBs. In one example, the CSI feedback can be for one of the TBs and can correspond to the TB that requires the largest number of a requested number of PDSCH repetitions. The CSI feedback can include an indication to indicate the selected TB for which CSI is reported. In one example, the CSI feedback is for the TB that received a NACK.

In one example, the CSI report can include an indication indicating whether the CSI is computed based on DMRS/PDSCH or based on CSI-RS. The CSI-RS resource can be configured for the CSI report by higher layers, such as Medium Access Control (MAC) or Radio Resource Control (RRC) layers.

In at least some examples, the CSI computed based on DMRS/PDSCH can be conditioned on one or more of the rank, number of layers, number of TBs, transmission scheme, TB to layer mapping, corresponding to the detected PDSCH. The PDSCH transmission signals can be on the PDSCH antenna ports in the set [1000, . . . , 1000+v−1] for v layers.

Figure 2:
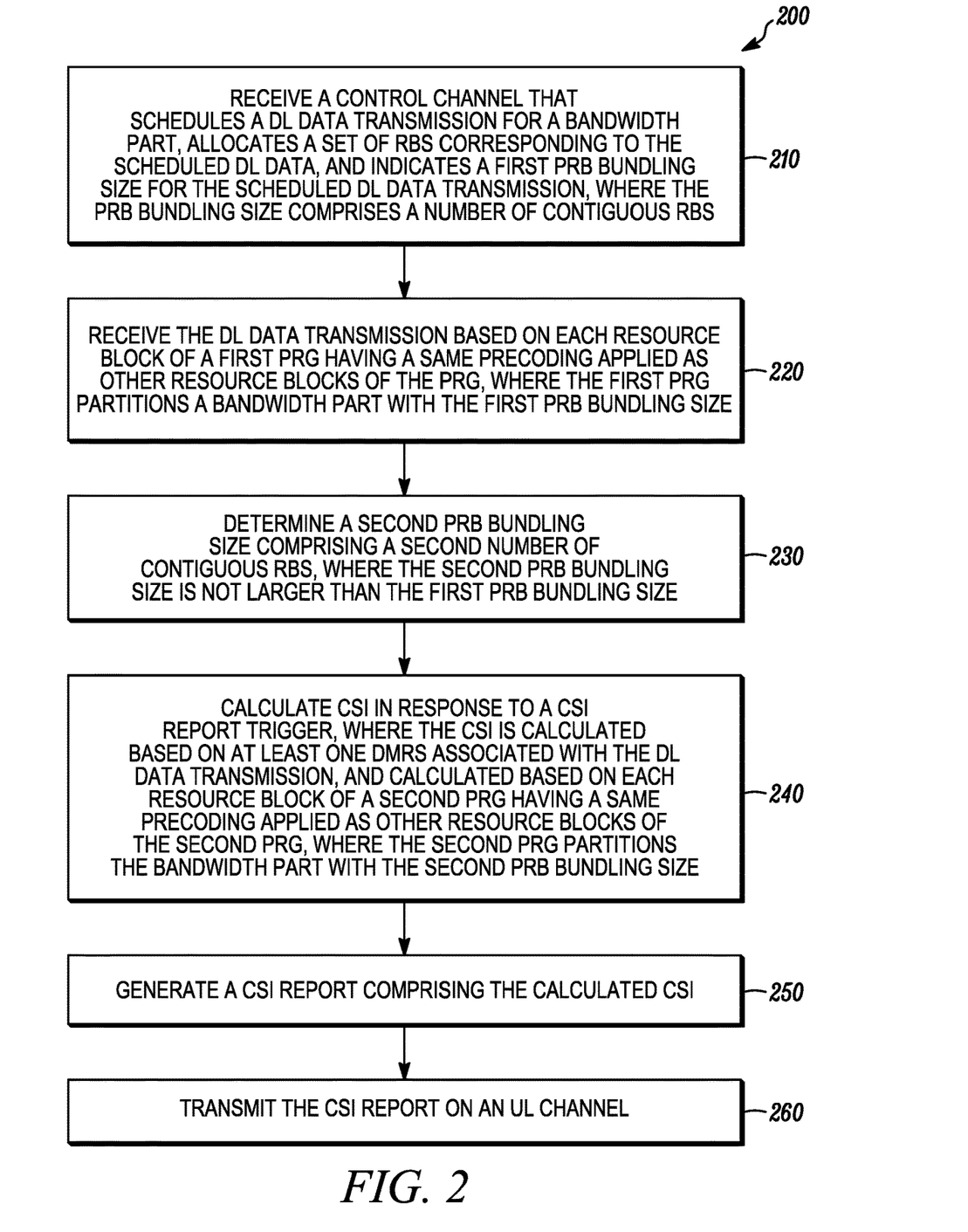
FIG. 2 is an example flowchart illustrating the operation of an apparatus according to a possible embodiment.

FIG. 2 is an example flowchart 200 illustrating the operation of a wireless communication device, such as the UE 110, according to a possible embodiment. At 210, a control channel can be received. The control channel can schedule a DL data transmission for a BWP. The control channel can also allocate a set of RBs corresponding to the scheduled DL data. The control channel can also indicate a first PRB bundling size P1 for the scheduled DL data transmission. The PRB bundling size P1 can be a first number of contiguous RBs.

At 220, the DL data transmission can be received. The DL data transmission can be based on each resource block of a first PRG having a same precoding applied as other resource blocks of the PRG. The first PRG can partition the BWP with the first PRB bundling size P1.

At 230, a second PRB bundling size P2 can be determined. The second PRB bundling size P2 can be a second number of contiguous RBs. The second PRB bundling size P2 may not be not larger than the first PRB bundling size P1. The second PRB bundling size P2 can be determined to be equal to the first PRB bundling size. The second PRB bundling size P2 can also be determined to be equal to a PRB bundling size that is indicated by higher layers.

At 240, CSI can be calculated in response to a CSI report trigger. A NACK feedback in response to DL data decoding can be the CSI report trigger. In another example, the CSI report trigger can be included in the control channel that schedules the DL data transmission. The CSI can include a CQI index. The CSI can be calculated based on at least one DMRS associated with the DL data transmission. The CSI can also be calculated based on each RB of a second PRG having a same precoding applied as other resource blocks of the second PRG. The second PRG can partition the BWP with the second PRB bundling size P2. For example, the CSI can be calculated based on each PRB of a PRG having the same precoding matrix of other PRBs of the PRG by being based on the assumption that each PRB of a PRG has the same precoding matrix of other PRBs of the PRG.

At 250, a CSI report can be generated. The CSI report can include the calculated CSI. According to a possible embodiment, a set of CSI reporting configurations can be received from a network. A set of CSI-RS resource configurations can be received from the network. The CSI report can be generated by generating a first part of a first CSI report from at least one CSI-RS corresponding to a first CSI-RS resource configuration of the set of CSI-RS resource configurations. The first part of the CSI report can include an RI, a PMI, and/or other information. The CSI report can be further generated by generating a second part of the CSI report from the received DL data transmission. The second part of the CSI report can include at least a CQI and/or an LI. According to a possible embodiment, a gNB can configure PUCCH resources for DMRS-based CSI, and the UE can indicate the CSI-configuration subset from the set of configured CSI reporting configurations index in the PUCCH. The second part of the CSI report can be based on at least one DMRS associated with the DL data transmission. An association index can be indicated to the network. The association index can indicate a subset of the set of CSI reporting configurations. The subset of CSI reporting configurations indicated by the association can include the CSI configurations the CSI report is associated with.

At 260, the CSI report can be transmitted on an UL channel. According to a possible embodiment, the DL data transmission can be PDSCH transmissions repeated a first number of times in a set of downlink slots. The CSI can be calculated based on the PDSCH being repeated a second number of times. The PDSCH does not have to actually be repeated the second number of times to calculate the CSI based on the PDSCH being repeated the second number of times. For example, the CSI can be calculated with the assumption of PDSCH being repeated a second number of times. The second number of PDSCH repetitions can be indicated by higher layer signaling. A value of the second number of PDSCH repetitions used for calculating the CSI can be included in the CSI report.

Figure 3:
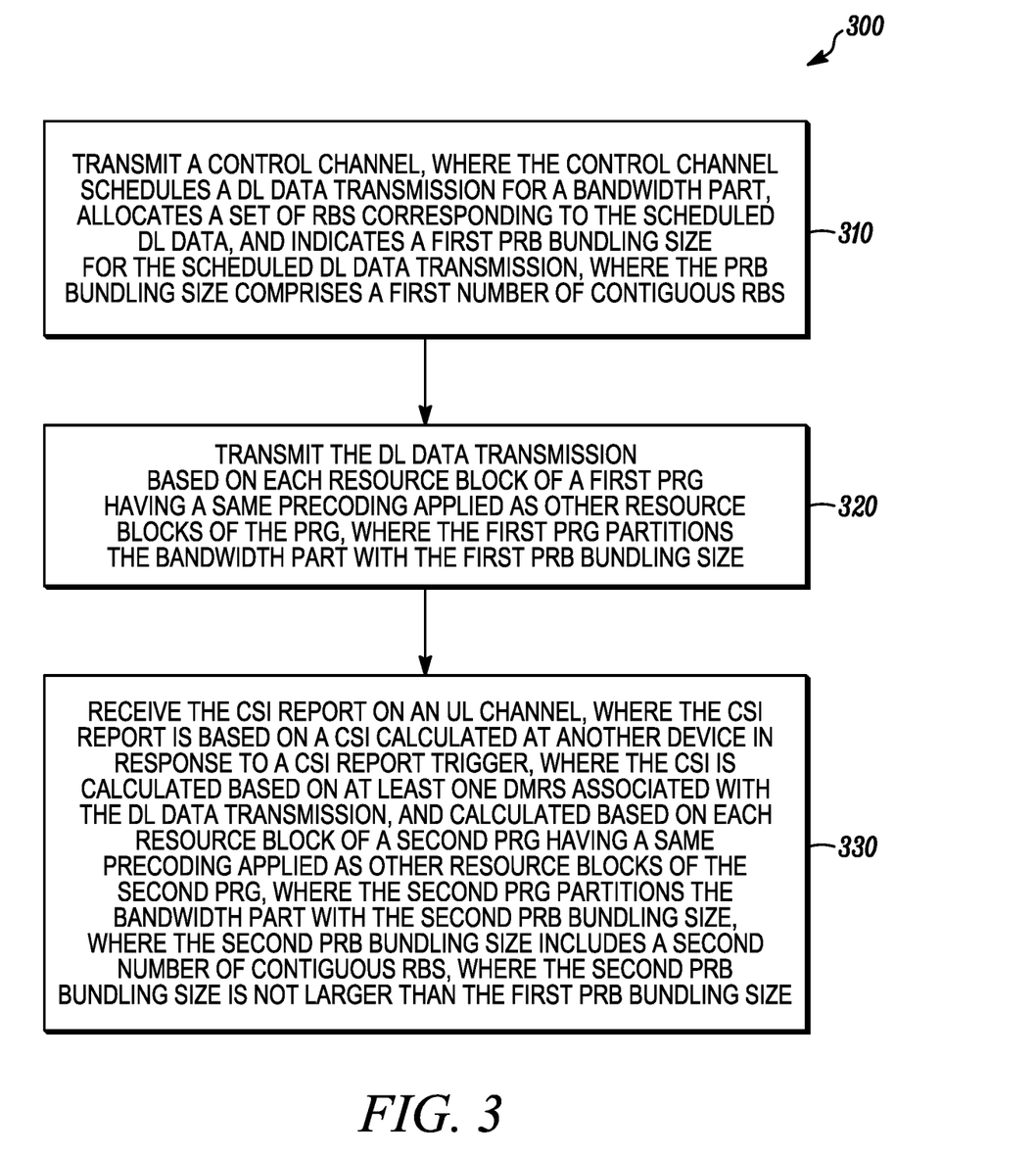
FIG. 3 is an example flowchart illustrating the operation of an apparatus according to a possible embodiment.

FIG. 3 is an example flowchart 300 illustrating the operation of a wireless communication device, such as the network entity 120, according to a possible embodiment. At 310, a control channel can be transmitted. The control channel can schedule a DL data transmission for a BWP. The control channel can allocate a set of RBs corresponding to the scheduled DL data. The control channel can indicate a first PRB bundling size for the scheduled DL data transmission. The PRB bundling size can be a first number of contiguous RBs.

At 320, the DL data transmission can be transmitted. The DL data transmission can be based on each resource block of a first PRG having a same precoding applied as other resource blocks of the PRG. The first PRG can partition the BWP with the first PRB bundling size.

At 330, a CSI report can be received on an UL channel. The CSI report can be based on a CSI calculated at another device in response to a CSI report trigger. The CSI can include a CQI index. The CSI report trigger can be a NACK feedback in response to DL data decoding. The CSI can be calculated based on at least one DMRS associated with the DL data transmission. The CSI can be calculated based on each resource block of a second PRG having a same precoding applied as other resource blocks of a second PRG. The second PRG can partition the BWP with the second PRB bundling size. The second PRB bundling size can be a second number of contiguous RBs. The second PRB bundling size may not be larger than the first PRB bundling size. The second PRB bundling size can be equal to the first PRB bundling size. The second PRB bundling size can also be equal to a PRB bundling size that is indicated by higher layers.

According to a possible embodiment, the DL data transmission can be PDSCH transmissions repeated a first number of times in a set of downlink slots. The CSI can be calculated based on the PDSCH being repeated a second number of times. The second number of PDSCH repetitions can be indicated by higher layer signaling. A value of the second number of PDSCH repetitions used for calculating the CSI can be included in the CSI report.

According to a possible embodiment, a set of CSI reporting configurations can be transmitted. A set of CSI-RS resource configurations can be transmitted. A first part of the CSI report can be from at least one CSI-RS corresponding to a first CSI-RS resource configuration of the set of CSI-RS resource configurations. The first part of the CSI report can include a RI, a PMI, and/or other information. A second part of the CSI report can be from the transmitted DL data transmission. An association index can be received. The association index can indicate a subset of the set of CSI reporting configurations. The subset of CSI reporting configurations indicated by the association can include the CSI configurations the CSI report is associated with.

Figure 4:
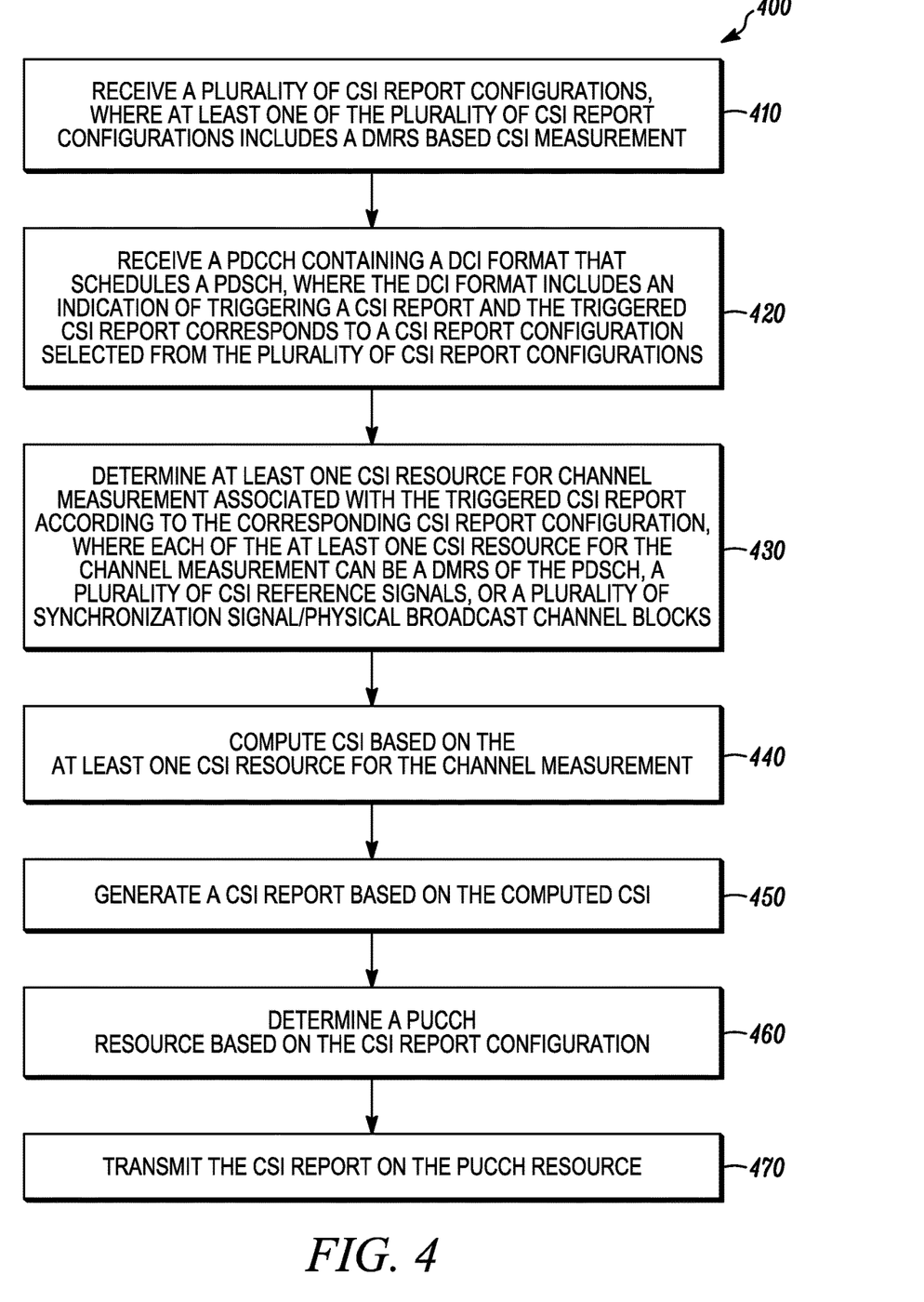
FIG. 4 is an example flowchart illustrating the operation of an apparatus according to a possible embodiment.

FIG. 4 is an example flowchart 400 illustrating the operation of a wireless communication device, such as the UE 110, according to a possible embodiment. At 410, a plurality of CSI report configurations can be received. At least one of the plurality of CSI report configurations can include a DMRS based CSI measurement.

At 420, a PDCCH containing a DCI format that schedules a PDSCH can be received. The DCI format can include an indication of triggering a CSI report and the triggered CSI report can correspond to a CSI report configuration selected from the plurality of CSI report configurations.

At 430, at least one CSI resource for channel measurement associated with the triggered CSI report can be determined according to the corresponding CSI report configuration. Each of the at least one CSI resource for the channel measurement can be a DMRS of the PDSCH, a plurality of CSI reference signals, a plurality of synchronization signal/physical broadcast channel blocks, or other resources. The PDSCH in addition to the DMRS of the PDSCH can be used as a CSI resource of the at least one CSI resource. A CQI index can be derived based on transmission parameters of the PDSCH and based on a CSI resource of the at least one CSI resource. The CSI resource can be the DMRS of the PDSCH.

At 440, CSI can be computed based on the at least one CSI resource for the channel measurement. At 450, a CSI report can be generated based on the computed CSI. The CSI report can be an aperiodic CSI report.

At 460, a PUCCH resource can be determined based on the CSI report configuration. The CSI report configuration can include information of a plurality of PUCCH resources and the PUCCH resource can be selected from the plurality of PUCCH resources. The PUCCH resource can be selected based on a transmission configuration indication state of the PDSCH. Each of the plurality of PUCCH resources can be associated with a distinctive transmission configuration indication state. The transmission configuration indication state of the PDSCH can be indicated in the DCI format. The transmission configuration indication state of the PDSCH can be the same as a transmission configuration indication state of a control resource set where the PDCCH is transmitted. The plurality of PUCCH resources can be associated with an uplink BWP identity.

At 470, the CSI report can be transmitted on the PUCCH resource. The transmission can include a number of DMRS symbols, a PRB bundling size, rate-matching around a control resource set, and/or other information.

Figure 5:
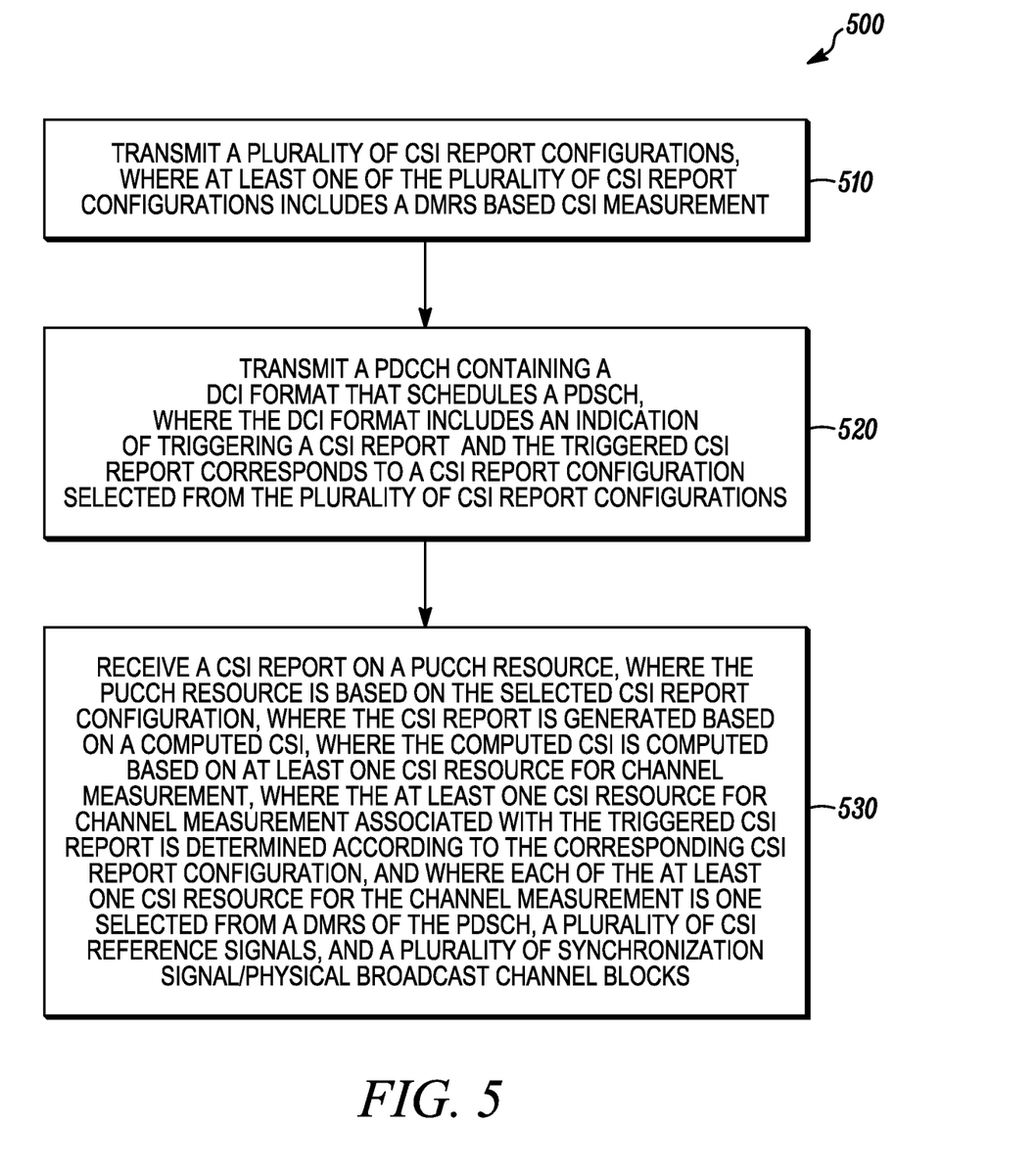
FIG. 5 is an example flowchart illustrating the operation of an apparatus according to a possible embodiment.

FIG. 5 is an example flowchart 500 illustrating the operation of a wireless communication device, such as the network entity 120, according to a possible embodiment. At 510, a plurality of CSI report configurations can be transmitted. At least one of the plurality of CSI report configurations can include a DMRS based CSI measurement.

At 520, a PDCCH containing a DCI format that schedules a PDSCH can be transmitted. The DCI format can include an indication of triggering a CSI report and the triggered CSI report can correspond to a CSI report configuration selected from the plurality of CSI report configurations.

At 530, a CSI report can be received on a PUCCH resource. The PUCCH resource can be based on the selected CSI report configuration. The CSI report can be generated based on a computed CSI. For example, the CSI report can be generated at a UE. The computed CSI can be computed based on at least one CSI resource for channel measurement. The at least one CSI resource for channel measurement associated with the triggered CSI report can be determined according to the corresponding CSI report configuration. Each of the at least one CSI resource for the channel measurement can a DMRS of the PDSCH, a plurality of CSI reference signals, a plurality of synchronization signal/physical broadcast channel blocks, or other resources. The operations of the other embodiments can also be performed.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
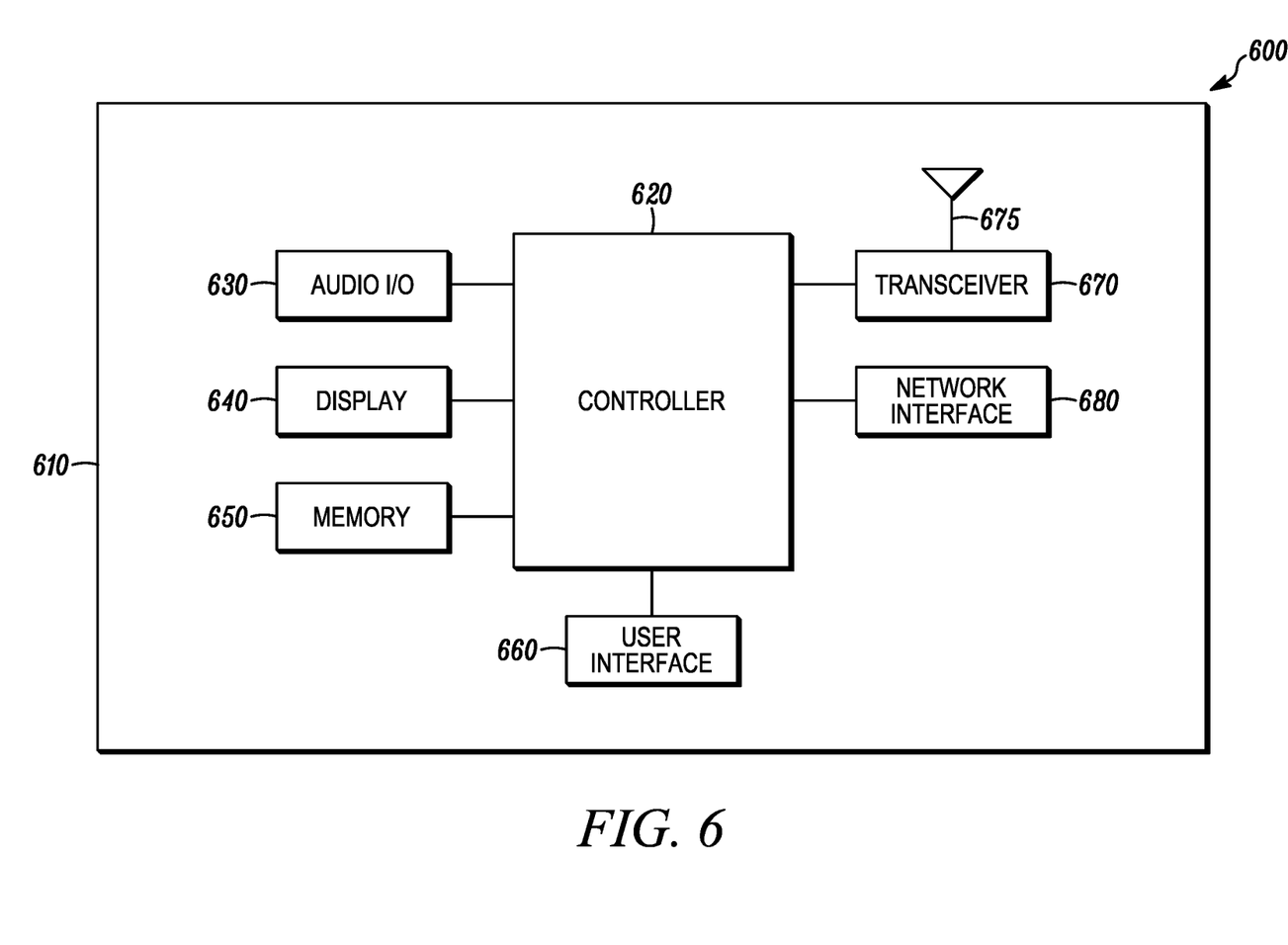
FIG. 6 is an example block diagram of an apparatus according to a possible embodiment.

FIG. 6 is an example block diagram of an apparatus 600, such as the UE 110, the network entity 120, or any other wireless communication device disclosed herein, according to a possible embodiment. The apparatus 600 can include a housing 610, a controller 620 coupled to the housing 610, audio input and output circuitry 630 coupled to the controller 620, a display 640 coupled to the controller 620, a memory 650 coupled to the controller 620, a user interface 660 coupled to the controller 620, a transceiver 670 coupled to the controller 620, at least one antenna 675 coupled to the transceiver 670, and a network interface 680 coupled to the controller 620. The apparatus 600 may not necessarily include all of the illustrated elements for different embodiments of the present disclosure. The apparatus 600 can perform the methods described in all the embodiments.

The display 640 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 670 can be one or more transceivers that can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 650 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 600 or the controller 620 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 650, elsewhere on the apparatus 600, in cloud storage, and/or anywhere else that can store software and/or an operating system. The apparatus 600 or the controller 620 may also use hardware to implement disclosed operations. For example, the controller 620 may be any programmable processor. Furthermore, the controller 620 may perform some or all of the disclosed operations. For example, some operations can be performed using cloud computing and the controller 620 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

In operation, the apparatus 600 can perform the methods and operations of the disclosed embodiments. The transceiver 670 can transmit and receive signals, including control signals and data signals and including information, such as control and data information. The controller 620 can generate and process the transmitted and received signals and information.

According to a possible embodiment in operation as a UE, the transceiver 670 can receive a control channel. The control channel can schedule a DL data transmission for a BWP. The control channel can also allocate a set of RBs corresponding to the scheduled DL data. The control channel can also indicate a first PRB bundling size for the scheduled DL data transmission. The first PRB bundling size can be a first number of contiguous RBs.

The transceiver 670 can receive the DL data transmission based on each resource block of a first PRG having a same precoding applied as other resource blocks of the PRG. The first PRG can partition the BWP with the first PRB bundling size.

The controller 620 can determine a second PRB bundling size including a second number of contiguous RBs. The second PRB bundling size may not be larger than the first PRB bundling size. The controller 620 can determine the second PRB bundling size to be equal to the first PRB bundling size. The controller 620 can also determine the second PRB bundling size to be equal to a PRB bundling size that is indicated by higher layers.

The controller 620 can calculate CSI in response to a CSI report trigger. The CSI can include a CQI index. The CSI report trigger can be a NACK feedback in response to DL data decoding. The CSI can be calculated based on at least one DMRS associated with the DL data transmission. The CSI can be calculated based on each resource block of a second PRG having a same precoding applied as other resource blocks of the second PRG. The second PRG can partition the BWP with the second PRB bundling size.

The controller 620 can generate a CSI report comprising the calculated CSI. According to a possible embodiment, the transceiver 670 can receive a set of CSI reporting configurations from a network. The transceiver 670 can receive a set of CSI-RS resource configurations from the network. The controller 620 can generate the CSI report by generating a first part of a first CSI report from at least one CSI-RS corresponding to a first CSI-RS resource configuration of the set of CSI-RS resource configurations. The first part of the CSI report can include at least a RI, a PMI, and/or other information. The controller 620 can also generate the CSI report by generating a second part of the CSI report from the received DL data transmission. The transceiver 670 can indicate to the network an association index indicating a subset of the set of CSI reporting configurations. The subset of CSI reporting configurations indicated by the association can include the CSI configurations the CSI report is associated with.

The transceiver 670 can transmit the CSI report on an UL channel. According to a possible embodiment, the DL data transmission can be PDSCH transmissions repeated a first number of times in a set of downlink slots. The CSI can be calculated based on the PDSCH being repeated a second number of times. The second number of PDSCH repetitions can be indicated by higher layer signaling. A value of the second number of PDSCH repetitions used for calculating the CSI can be included in the CSI report.

According to a possible embodiment in operation as a network entity, the controller 620 can control operations of the apparatus 600. The transceiver 670 can transmit a control channel. The control channel can schedule a DL data transmission for a BWP. The control channel can also allocate a set of RBs corresponding to the scheduled DL data. The control channel can also indicate a first PRB bundling size for the scheduled DL data transmission. The PRB bundling size can be a first number of contiguous RBs. The transceiver 670 can transmit the DL data transmission based on each resource block of a first PRG having a same precoding applied as other resource blocks of the PRG. The first PRG can partition the BWP with the first PRB bundling size.

The transceiver 670 can receive a CSI report on an UL channel. The CSI report can be based on a CSI calculated at another device in response to a CSI report trigger. The CSI can be calculated based on at least one DMRS associated with the DL data transmission. The CSI can also be calculated based on each resource block of a second PRG having a same precoding applied as other resource blocks of a second PRG. The second PRG can partition the BWP with a second PRB bundling size. The second PRB bundling size can be a second number of contiguous RBs. The second PRB bundling size may not be larger than the first PRB bundling size. The apparatus 600 can perform further operations based on other disclosed embodiments.

According to a possible embodiment in operation as a UE, the transceiver 670 can receive a plurality of CSI report configurations. At least one of the plurality of CSI report configurations can include a DMRS based CSI measurement. The transceiver 670 can receive a PDCCH containing a DCI format that schedules a PDSCH. The DCI format can include an indication of triggering a CSI report and the triggered CSI report corresponds to a CSI report configuration selected from the plurality of CSI report configurations.

The controller 620 can determine at least one CSI resource for channel measurement associated with the triggered CSI report according to the corresponding CSI report configuration. Each of the at least one CSI resource for the channel measurement can be a DMRS of the PDSCH, a plurality of CSI reference signals, a plurality of synchronization signal/physical broadcast channel blocks, or any other resource.

The controller 620 can compute CSI based on the at least one CSI resource for the channel measurement. The controller 620 can generate a CSI report based on the computed CSI. The controller 620 can determine a PUCCH resource based on the CSI report configuration. The transceiver 670 can transmit the CSI report on the PUCCH resource. The apparatus 600 can also incorporate features of the other embodiments.

At least some embodiments can provide a method at a device. The method can include receiving a set of CSI reporting configurations from a network. The method can include receiving a set of CSI-RS resource configurations from a network. The method can include receiving DL data. The method can include generating, from CSI-RS corresponding to a first CSI-RS resource configuration, a first part of a first CSI report. The method can include generating, from the received DL data, a second part of the first CSI report. The method can include indicating to the network an association index, indicating the first CSI report is associated with a subset of the set of CSI reporting configurations. The method can include transmitting the first CSI report to the network.

The association index can be sent in a field along with the first CSI report. The field can include a bit-field of a size corresponding to the number of configured CSI reports. The first CSI-RS resource configuration can be associated with a first DL BWP. The DL data can be associated with a second BWP that is different than the first DL BWP.

The UE may not be expected to generate/transmit the first CSI report if the second BWP is larger than the first BWP. The second part of the first CSI report can include a CQI index. The first part of the first CSI report can include at least one of the RI or PMI. The UE can derive the CQI index based on the PRB bundling size of the DL data. The DL data can include a TB and the network can repeat the DL data 'N' times. The network can send multiple PDCCHs in different set of symbols to schedule the DL data and the number of DL data repetitions after the $i^{th}$ PDCCH, $N_i$, of the multiple PDCCHs can be indicated in the PDCCH. The UE can generate the CQI index based on the number of DL data repetitions, N. The UE can decode the $i^{th}$ PDCCH. The UE can generate the CQI index based on the number of DL data repetitions $N_i$. The UE can indicate to the network the number of DL data repetitions, $N_i$, used for CQI derivation. The association index can be sent in a field along with the second part of the first CSI report.

TS 38.214 can provide CSI reporting settings. Each Reporting Setting CSI-ReportConfig can be associated with a single downlink BWP indicated by higher layer parameter bwp-Id given in the associated CSI-ResourceConfig for channel measurement and can contain the parameter(s) for one CSI reporting band:codebook configuration including codebook subset restriction, time-domain behavior, frequency granularity for CQI and PMI, measurement restriction configurations, and the CSI-related quantities to be reported by the UE such as the Layer Indicator (LI), L1-RSRP, CRI, and SSB Resource Indicator (SSBRI).

The time domain behavior of the CSI-ReportConfig can be indicated by the higher layer parameter reportConfigType and can be set to 'aperiodic', 'semiPersistentOnPUCCH', 'semiPersistentOnPUSCH', or 'periodic'. For periodic and semiPersistentOnPUCCH/semiPersistentOnPUSCH CSI reporting, the configured periodicity and slot offset can apply in the numerology of the UL BWP in which the CSI report is configured to be transmitted on. The higher layer parameter reportQuantity can indicate the CSI-related or L1-RSRP-related quantities to report. The reportFreqConfiguration parameter can indicate the reporting granularity in the frequency domain, including the CSI reporting band and if PMI/CQI reporting is wideband or sub-band. The timeRestrictionForChannelMeasurements parameter in CSI-ReportConfig can be configured to enable time domain restriction for channel measurements and timeRestrictionForInterferenceMeasurements can be configured to enable time domain restriction for interference measurements. The CSI-ReportConfig can also contain CodebookConfig, which can contain configuration parameters for Type-I or Type II CSI including codebook subset restriction, and configurations of group-based reporting.

TS 38.214 can also provide CSI resource settings. Each CSI Resource Setting CSI-ResourceConfig can contain a configuration of a list of S≥1 CSI resource sets given by higher layer parameter csi-RS-ResourceSetList, where the list can include references to either or both of Non-Zero Power (NZP) CSI-RS resource set(s) and SS/PBCH block set(s) or the list can include references to CSI-IM resource set(s). Each CSI resource setting can be located in the DL BWP identified by the higher layer parameter bwp-id, and all CSI Resource Settings linked to a CSI Report Setting can have the same DL BWP.

The time domain behavior of the CSI-RS resources within a CSI Resource Setting can be indicated by the higher layer parameter resourceType and can be set to aperiodic, periodic, or semi-persistent. For periodic and semi-persistent CSI resource settings, the number of CSI-RS resource sets configured can be limited to S=1. For periodic and semi-persistent CSI resource settings, the configured periodicity and slot offset can be given in the numerology of its associated DL BWP, as given by bwp-id. When a UE is configured with multiple CSI-ResourceConfigs including the same NZP CSI-RS resource ID, the same time domain behavior can be configured for the CSI-ResourceConfigs. When a UE is configured with multiple CSI-ResourceConfigs including the same CSI-IM resource ID, the same time-domain behavior can be configured for the CSI-ResourceConfigs.

The following can be configured via higher layer signaling for one or more CSI Resource Settings for channel and interference measurement: CSI-IM resource for interference measurement as described in Subclause 5.2.2.4; NZP CSI-RS resource for interference measurement as described in Subclause 5.2.2.3.1; and NZP CSI-RS resource for channel measurement as described in Subclause 5.2.2.3.1.

The UE can assume that the NZP CSI-RS resource(s) for channel measurement and the CSI-IM resource(s) for interference measurement configured for one CSI reporting are resource-wise Quasi Co Located (QCLed) with respect to 'QCL-TypeD'. When NZP CSI-RS resource(s) is used for interference measurement, the UE can assume that the NZP CSI-RS resource for channel measurement and the CSI-RS resource and/or NZP CSI-RS resource(s) for interference measurement configured for one CSI reporting are QCLed with respect to 'QCL-TypeD'.

TS 38.214 can provide CQI index derivation assumptions. Based on an unrestricted observation interval in time unless specified otherwise in this Subclause, and an unrestricted observation interval in frequency-TBD, the UE can derive for each CQI value reported in uplink slot n the highest CQI index which satisfies the following condition: A single PDSCH TB with a combination of modulation scheme, target code rate and TB size corresponding to the CQI index, and occupying a group of downlink physical resource blocks termed the CSI reference resource, could be received with a TB error probability not exceeding: 0.1, if the higher layer parameter cqi-Table in CSI-ReportConfig configures 'table 1' (corresponding to Table 5.2.2.1-2), or 'table2' (corresponding to Table 5.2.2.1-3), or 0.00001, if the higher layer parameter cqi-Table in CSI-ReportConfig configures 'table3' (corresponding to Table 5.2.2.1-4).

In the CSI reference resource, the UE can assume the following for the purpose of deriving the CQI index, and if also configured, for deriving PMI and RI: the first 2 OFDM symbols are occupied by control signaling; the number of PDSCH and DM-RS symbols is equal to 12; the same BWP subcarrier spacing configured as for the PDSCH reception; the bandwidth as configured for the corresponding CQI report; the reference resource uses the CP length and subcarrier spacing configured for PDSCH reception; no resource elements used by primary or secondary synchronization signals or PBCH; redundancy version 0; and the ratio of PDSCH Energy per Resource Element (EPRE) to CSI-RS EPRE is as given in Subclause 4.1.

The UE can assume no REs allocated for NZP CSI-RS and ZP CSI-RS. The UE can assume the same number of front-loaded DM-RS symbols as the maximum front-loaded symbols configured by the higher layer parameter maxLength in DMRS-DownlinkConfig. The UE can assume the same number of additional DM-RS symbols as the additional symbols configured by the higher layer parameter dmrs-AdditionalPosition. The UE can assume the PDSCH symbols are not containing DM-RS. The UE can assume PRB bundling size of 2 PRBs.

The PDSCH transmission scheme where the UE can assume that PDSCH transmission would be performed with up to 8 transmission layers can be defined in Subclause 7.3.1.4 of 4, TS 38.211. For CQI calculation, the UE can assume that PDSCH signals on antenna ports in the set [1000, . . . , 1000+v−1] for v layers would result in signals equivalent to corresponding symbols transmitted on antenna ports [3000, . . . , 3000+P−1], as given by $$\begin{bmatrix} y^{(3000)}(i) \\ M \\ y^{(3000+P-1)}(i) \end{bmatrix} = W(i) \begin{bmatrix} x^{(0)}(i) \\ M \\ x^{(v-1)}(i) \end{bmatrix}$$

where $x(i)=[x^{(0)}(i) \ldots x^{(v-1)}(i)]^T$ is a vector of PDSCH symbols from the layer mapping defined in Subclause 7.3.1.4 of TS 38.211, $P \in [1, 2, 4, 8, 12, 16, 24, 32]$ is the number of CSI-RS ports. If only one CSI-RS port is configured, W(i) can be 1. If the higher layer parameter reportQuantity in CSI-ReportConfig for which the CQI is reported is set to either 'cri-RI-PMI-CQI' or 'cri-RI-LI-PMI-CQI', W(i) can be the precoding matrix corresponding to the reported PMI applicable to x(i). If the higher layer parameter reportQuantity in CSI-ReportConfig for which the CQI is reported is set to 'cri-RI-CQI', W(i) can be the precoding matrix corresponding to the procedure described in Subclause 5.2.1.4.2. If the higher layer parameter reportQuantity in CSI-ReportConfig for which the CQI is reported is set to 'cri-RI-i1-CQI', W(i) can be the precoding matrix corresponding to the reported i1 according to the procedure described in Subclause 5.2.1.4. The corresponding PDSCH signals transmitted on antenna ports [3000, . . . , 3000+P−1] can have a ratio of EPRE to CSI-RS EPRE equal to the ratio given in Subclause 4.1.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:
    a controller that controls operations of the apparatus; and
    a transceiver coupled to the controller, where the transceiver
        transmits a control channel, where the control channel schedules a downlink data transmission for a bandwidth part,
        allocates a set of resource blocks corresponding to the scheduled downlink data, and
        indicates a first physical resource block bundling size for the scheduled downlink data transmission, where the first physical resource block bundling size comprises a first number of contiguous resource blocks,
    transmits the downlink data transmission based on each resource block of a first precoding resource group having a same precoding applied as other resource blocks of the precoding resource group, where the first precoding resource group partitions the bandwidth part with the first physical resource block bundling size, and
    receives a channel state information report on an uplink channel, where the channel state information report is based on a channel state information calculated at another device in response to a channel state information report trigger, where the channel state information is calculated based on at least one demodulation reference signal associated with the downlink data transmission, and calculated based on each resource block of a second precoding resource group having a same precoding applied as other resource blocks of the second precoding resource group, where the second precoding resource group partitions the bandwidth part with a second physical resource block bundling size, where the second physical resource block bundling size comprises a second number of contiguous resource blocks, where the second physical resource block bundling size is not larger than the first physical resource block bundling size.

2. The apparatus according to claim 1, wherein the second physical resource block bundling size is equal to the first physical resource block bundling size.

3. The apparatus according to claim 1, wherein the second physical resource block bundling size is equal to a physical resource block bundling size that is indicated by higher layers.

4. The apparatus according to claim 1, wherein the channel state information comprises a channel quality indicator index.

5. The apparatus according to claim 1, wherein the channel state information report trigger comprises a negative acknowledgement feedback in response to downlink data decoding.

6. The apparatus according to claim 1,
wherein the downlink data transmission comprises physical downlink shared channel transmissions repeated a first number of times in a set of downlink slots, and
wherein the channel state information is calculated based on the physical downlink shared channel being repeated a second number of times.

7. The apparatus according to claim 6, wherein a value of the second number of physical downlink shared channel repetitions used for calculating the channel state information is included in the channel state information report.

8. The apparatus according to claim 6, wherein the second number of physical downlink shared channel repetitions is indicated by higher layer signaling.

9. The apparatus according to claim 1,
wherein the transceiver
transmits a set of channel state information reporting configurations, and
transmits a set of channel state information reference signal resource configurations,
wherein a first part of the channel state information report from at least one channel state information reference signal corresponding to a first channel state information reference signal resource configuration of the set of channel state information reference signal resource configurations,
wherein a second part of the channel state information report is from the transmitted downlink data transmission, and
wherein the transceiver receives an association index indicating a subset of the set of channel state information reporting configurations, where the subset of channel state information reporting configurations indicated by the association comprises the channel state information configurations the channel state information report is associated with.

10. The apparatus according to claim 9, wherein the first part of the channel state information report includes at least one selected from a rank indicator and a precoding matrix indicator.

11. A method at a device, the method comprising:
transmitting a control channel, where the control channel
schedules a downlink data transmission for a bandwidth part, and
allocates a set of resource blocks corresponding to the scheduled downlink data, and
indicates a first physical resource block bundling size for the scheduled downlink data transmission, where the first physical resource block bundling size comprises a first number of contiguous resource blocks;
transmitting the downlink data transmission based on each resource block of a first precoding resource group having a same precoding applied as other resource blocks of the precoding resource group, where the first precoding resource group partitions the bandwidth part with the first physical resource block bundling size; and
receiving a channel state information report on an uplink channel, where the channel state information report is based on a channel state information calculated at another device in response to a channel state information report trigger, where the channel state information is calculated based on at least one demodulation reference signal associated with the downlink data transmission, and calculated based on each resource block of a second precoding resource group having a same precoding applied as other resource blocks of the second precoding resource group, where the second precoding resource group partitions the bandwidth part with a second physical resource block bundling size, where the second physical resource block bundling size comprises a second number of contiguous resource blocks, where the second physical resource block bundling size is not larger than the first physical resource block bundling size.

12. The method according to claim 11, wherein the second physical resource block bundling size is equal to the first physical resource block bundling size.

13. The method according to claim 11, wherein the second physical resource block bundling size is equal to a physical resource block bundling size that is indicated by higher layers.

14. The method according to claim 11, wherein the channel state information comprises a channel quality indicator index.

15. The method according to claim 11, wherein the channel state information report trigger comprises a negative acknowledgement feedback in response to downlink data decoding.

* * * * *